United States Patent [19]

Pargeter

[11] Patent Number: 4,780,135

[45] Date of Patent: Oct. 25, 1988

[54] PROCESS FOR THE DETOXIFICATION OF STEEL PLANT WASTES

[75] Inventor: John K. Pargeter, Ellwood City, Pa.

[73] Assignee: The International Metals Reclamation Company, Inc., Ellwood City, Pa.

[21] Appl. No.: 66,753

[22] Filed: Jun. 25, 1987

[51] Int. Cl.[4] .............................. C21B 3/04; C22B 7/02
[52] U.S. Cl. ........................................... 75/25
[58] Field of Search ............................. 75/25; 106/900

[56] References Cited

U.S. PATENT DOCUMENTS

| | | | |
|---|---|---|---|
| 3,836,353 | 9/1974 | Holley | 75/3 |
| 4,266,967 | 5/1981 | Yamada et al. | 75/36 |
| 4,396,424 | 8/1983 | Yatsunami et al. | 75/25 |
| 4,488,905 | 12/1984 | Santen | 75/25 |
| 4,612,041 | 9/1986 | Matsuoka et al. | 75/25 |

FOREIGN PATENT DOCUMENTS

| | | | |
|---|---|---|---|
| 0024926 | 2/1980 | Japan | 75/25 |
| 2010170 | 2/1982 | Japan | 75/25 |
| 0141345 | 8/1983 | Japan | 75/25 |

OTHER PUBLICATIONS

Chemical Abstracts (1977) 86:7638z.
Chemical Abstracts (1986) 105:9840t.
Chemical Abstracts (1986) 104:190312q.
Chemical Abstracts (1977) 86:4587e.

*Primary Examiner*—L. Dewayne Rutledge
*Assistant Examiner*—David Schumaker
*Attorney, Agent, or Firm*—Raymond J. Kenny; Edward A. Steen

[57] ABSTRACT

A technique for rendering toxic metals (chromium, lead, cadmium and arsenic) contained in steel plant furnace dust innocuous and suitable for burial with minimal adverse environmental impact. Pelletized iron oxide containing dust is introduced into a rotary hearth furnace under a reducing atmosphere in excess of 600° C. The higher iron oxides are reduced to FeO which in turn complexes with the toxic metals to form relatively benign products.

9 Claims, No Drawings

PROCESS FOR THE DETOXIFICATION OF STEEL PLANT WASTES

TECHNICAL FIELD

The instant invention relates to pollution control in general and, more particularly, to a technique for the economical and safe treatment and disposal of noxious steel plant dust.

BACKGROUND ART

The dust produced as a result of electric furnace steel making processes has been classified by the U.S. Environmental Protection Agency as "Hazardous Waste". Accordingly, this material must be manifested for transport and disposed only in a limited number of licensed hazardous waste disposal sites. This is costly, currently in excess of $100/ton. As the number of available sites diminishes, clearly the disposal costs will inexorably rise.

Unfortunately, proposed alternatives are generally impractical. The world alloy steel business is based upon electric arc furnace melting, with the inevitable production of fume. To add insult to injury, the ingredient value of the fume is usually so low as to preclude economic recovery of materials entrained in the fume.

Typical dust arising from the production of alloy steel has the following representative composition (in weight percent):

Fe—25.0–35.0
Ni—0.5–1.5
Cr—0.5–2.0
Mn—2.0–4.0
Zn—4.0–10.0
Pb—1.0–5.0
Cd—0.1–1.0
$Al_2O_3$—0.5–2.5
CaO—3.0–12.0
$SiO_2$—02 3.0–15.0
MgO—1.0–5.0

Dust from the increasingly popular mini-mills is similar but usually contains even lower levels of nickel and chromium and higher zinc—up to 30% zinc.

The hazardous nature of electric furnace oxide fume is caused by the generation of soluble oxides of Pb, Cd, As and $Cr^{6+}$ formed at high temperatures above the steel bath and in the off-gas system of the electric arc furnace. After the dust is disposed in landfills, the soluble oxides find their way into the water table causing pollution.

The Environmental Protection Agency has specified a toxicity test using an accelerated leach with diluted acetic acid. Toxicity is then determined as milligrams of listed metals per liter of leachate. Current listed metals and their test limits are given below:

Chromium—5 mg/l
Lead—5 mg/l
Cadmium—1 mg/l
Arsenic—5 mg/l

The potentially valuable elements in the dust such as nickel, chromium, zinc and iron are present at levels lower than those of the unimportant materials and cannot currently be recovered economically.

In particular there are a number of techniques that may be used to recover selected components. For example, the SKF Plasmadust™ process is designed to recover zinc. However, it does hot appear to be economically viable since high zinc dust generators are widely separated and the current processing and shipping costs of the recovered zinc vis-a-vis the current cost of zinc is not attractive. Another recovery alternative is taught by U.S. Pat. 3,836,353. Iron and oxide impurities are recovered by the volatilization of zinc, lead and sulfur impurities and the subsequent formation of iron oxide containing pellets in a rotary hearth furnace. Iron oxide prices are similarly depressed.

From the foregoing, it appears that a low cost process to render these listed wastes harmless and simply return them safely to the earth from whence they came and without the concern for element recovery is desirable.

SUMMARY OF THE INVENTION

Accordingly, there is provided an economical technique for the formation of stable complex compounds between the oxides of the toxic elements present in the flue dust and the lower oxides of iron (FeO). By forming these complexes, the toxic elements are rendered relatively innocuous and may be cheaply returned to the earth essentially in the form they were first removed.

These insoluble compounds may be formed by heating the pelletized dust above 600° C. under a reducing atmosphere in a rotary hearth furnace.

PREFERRED MODE FOR CARRYING OUT THE INVENTION

The basis of the process is the formation of stable and insoluble complex compounds between the oxides of the toxic elements present in the dust and the lower (valence) oxide of iron (FeO).

These compounds may be formed in the alloy steel melting dust by heating the materials in a rotary hearth furnace above about 600° C. under a reducing atmosphere preferably equivalent to about 50% CO and 50% $CO_2$ in order to form ferrous oxide (FeO) from the hematite (ferric oxide—$Fe_2O_3$) and magnetite ($Fe_2O_4$) generally present in the dust.

Electric arc furnace dust removed from bag houses, electrostatic precipitators and the like may be pelletized by any method known to those in art. Analysis of the dust must be undertaken to determine whether sufficient quantities of carbon and iron are present. The carbon addition, if any, must match the zinc and toxic metal contents. Carbon may be added as coke breeze, coal dust, charcoal or any other suitable carbon source.

Similarly, if the dust does not contain sufficient iron to form FeO, suitable iron sources such as mill scale, iron ore, etc. may be tapped.

After the dust has been augmented, if necessary, with carbon and iron and pelletized, it is preferably introduced into a rotary hearth furnace ("RHF") at temperatures ranging between about 600° C.–1100° C. for about eight to twenty minutes.

An RHF is a continuous reheating furnace generally having a circular inner wall circumscribed by a spaced outer wall. The void formed therebetween includes an annular rotating hearth. In order to retain the heat generated within the furnace, the walls are relatively low so as to enable the roof to be close to the hearth. Burners, instrumentation, temperature regulators, etc. are disposed within the furnace.

Material, in this case the pellets, is usually loaded (dropped) onto the rotating hearth by a conveyor or chute. The depth of material on the hearth may be controlled although it is typical to limit the depth of the material to allow maximum heating and exposure to the predetermined furnace environment.

Generally, after almost one complete rotation of the hearth the material is removed from the furnace by suitable means, such as a discharge screw. (See, for example, U.S. Pat. No. 4,636,127.)

Under the above-referenced preferred conditions, FeO rapidly forms from the hematite and magnetite and combines with the PbO, ZnO and $Cr_2O_3$ present in the pellets to form $FeO.PbO$, $FeO.ZnO$, $2FeO.Cr_2O_3$ (ferrites and chromites respectively) and an FeAs spinel.

The resultant iron complex products are stable and insoluble. The discharge product may be removed from the RHF, air cooled and disposed of in a landfill after the appropriate EPA delisting procedures have been followed.

It should be appreciated that instead of being left with toxic materials or conducting numerous relatively expensive steps to recover economically dubious materials, the benign products of iron complexes are very similar to the original components first going into process. For example, the resultant zinc ferrite is not than the franklinite that originally was used in In essence, the instant process simply returns the bad actor metals to their originally occurring state as found in the earth.

EXAMPLE

Twenty tons ($1.8 \times 10^4$ kg) of alloy steel melt shop baghouse dust were obtained with the following composition (weight percent):

C—1.2
Fe—31.5
S—0.27
$Al_2O_3$—1.0
$SiO_2$—10.7
CaO—7.2
MgO—7.4
Pb—1.3
Cd—0.04
Zn—6.8
As—0.2

The EPA leachate test showed the following composition:

Cr—0.2 mg/l
Pb—9 mg/l
Cd—13 mg/l
As—4 mg/l

Two ten ton ($9.1 \times 10^3$ kg) tests were performed on the dust. Test 1 received a 5% coke breeze addition (4% carbon addition) and Test 2 received a 10% coke breeze addition (8% carbon addition). Coke breeze usually contains about 80% carbon and 20% ash.

Pellets were made up and processed in the RHF for fifteen minutes at a temperature of 850° C. The furnace environment was maintained at 50% CO and 50% $CO_2$.

Samples from both tests were treated under the EPA toxicity test with the following results (mg/l):

|    | Test 1 (4% C Added) | Test 2 (8% C Added) |
|----|---------------------|---------------------|
| Cr | 2.3                 | 0.04                |
| Pb | 7.7                 | 0.2                 |
| Cd | .2                  | 0.06                |
| As | .1                  | 0.05                |

Test 1 showed only a slight improvement in leach test results compared to the raw feed materials, whereas Test 2 gave results considerably below the toxicity limits. The reason was that Test 1 had insufficient carbon present to provide enough FeO for complete reaction with the toxic oxides. Zinc oxide appears to react proficiently with FeO so it appears that there was enough of the FeO present to satisfy the zinc ferrite formation in addition to reacting with the toxic components.

Inasmuch as a critical feature of the instant process is the formation of the proper quantity of FeO, analysis should be undertaken to ensure that the dust mixture contains the proper stochiometric amount of carbon and iron to form the desired end product complexes. This calculation is, of course, a function of the quantity of heavy metals present and the inherent levels of iron and carbon in the dust and may be computed by methods known to those skilled in the art.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiment of the invention in which an exclusive property or privilege is claimed are defined as follows:

1. A method of detoxifying steel plant metal wastes containing iron, lead, cadmium, arsenic, zinc and chromium, the method comprising:
    a. collecting the wastes in dust form;
    b. agglomerating the dust;
    c. exposing the agglomerated dust to a reducing environment at a temperature from about 600° C. to about 1100° C. forming FeO and causing the FeO to form complexes with the metals; and
    d. disposing of the detoxified product.

2. The method according to claim 1 wherein the agglomerated dust is introduced into a rotary hearth furnace.

3. The method according to claim 1 wherein ferrites and chromites are generated.

4. The method according to claim 1 wherein additional carbon is added to the dust.

5. The method according to claim 1 wherein additional iron is added to the dust.

6. The method according to claim 1 wherein the heating and reducing process is conducted for about eight to twenty minutes.

7. The method according to claim 1 wherein iron-arsenic compounds are generated.

8. The method according to claim 1 wherein the reducing environment includes about 50% CO and about 50% $CO_2$.

9. The method according to claim 1 wherein the detoxified product is introduced into the ground.

* * * * *